April 14, 1964
L. H. SENCE
3,128,712
CANNED MOTOR PUMP
Filed Aug. 3, 1961
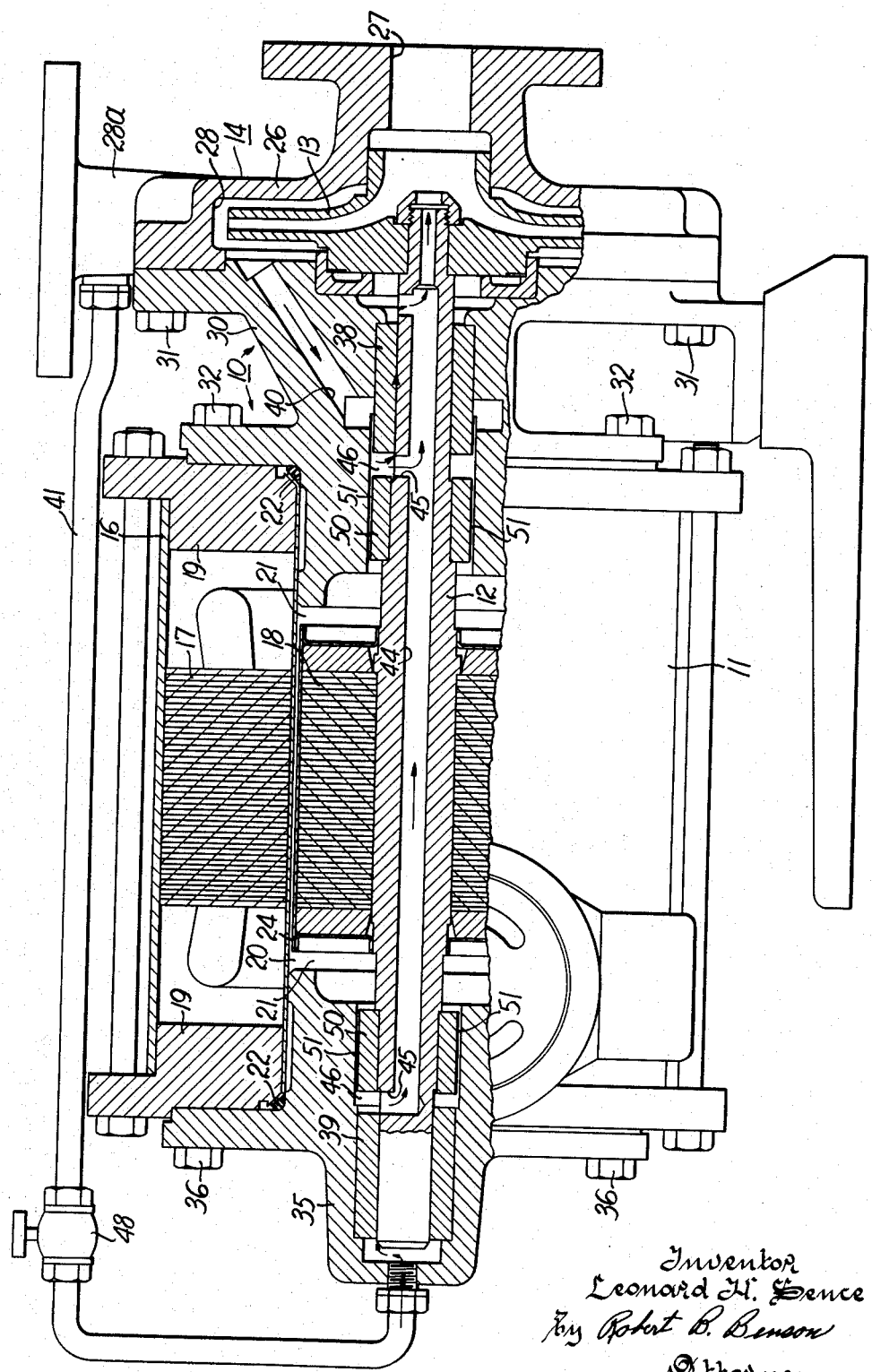
Inventor
Leonard H. Sence
By Robert B. Benson
Attorney

United States Patent Office 3,128,712
Patented Apr. 14, 1964

3,128,712
CANNED MOTOR PUMP
Leonard H. Sence, Milford, Ohio, assignor to Allis-Chalmers Manufacturing Company, Milwaukee, Wis.
Filed Aug. 3, 1961, Ser. No. 129,099
6 Claims. (Cl. 103—87)

This invention relates generally to canned motors. More specifically this invention relates to canned motor pump units having improved efficiency.

The canned motor is a type of motor having a cylindrical sleeve positioned between the rotor and stator of the motor to form a rotor chamber separated from the stator. In a motor pump unit the can is sealed at one end to the motor housing and at the other end to the bearing housing intermediate the motor and the pump. Fluid leaking from the pump along the shaft flows into the can and then through appropriate conduits back to the suction side of the pump. Hence this type of unit is known in the art as the sealless motor pump unit.

The canned motor pump unit is ideal for many applications such as pumping highly explosive, precious or toxic liquids. However, in these units especially when operating at high speeds and pumping dense liquids the power loss due to the rotor rotating in a chamber full of liquid are exceedingly high. For example, in pumps operating at 7200 r.p.m. and having the rotor in a chamber full of liquid, more than 50% of the power can be consumed in rotating the rotor rather than in pumping the liquid.

The pump of this invention overcomes the problem mentioned above by controlling the volume of liquid flowing into the rotor chamber so that there is a minimum of liquid in the chamber. This is accomplished by restricting the inlets into the rotor chamber and balancing the pressure across the rotor chamber so that there is no pressure differential or at most an insignificant pressure differential. The very small amount of liquid that then flows into the rotor chamber is heated by the heat from the motor and hence vaporizes. The vapor expands and then exerts a slightly greater pressure than the liquid outside of the rotor chamber. Therefore, no more liquid flows into the rotor chamber and the rotor operates in a vapor with a minimum of power loss.

Therefore, it is the object of this invention to provide a new and improved canned motor.

Another object of this invention is to provide a new and improved motor pump unit.

Another object of this invention is to provide a new and improved motor pump unit having increased efficiency.

Other objects and advantages of this invention will be apparent from the following description when read in connection with the accompanying drawing, in which:

The figure is a cross sectional view of a motor pump unit of this invention.

Referring more particularly to the drawing by characters of reference, the invention is illustrated in connection with a motor pump unit 10. The motor pump unit comprises generally a motor 11 driving a shaft 12 which is in turn operatively connected to the impeller 13 of a centrifugal pump 14.

In the illustrated embodiment the motor 11 comprises an annular housing or yoke 16 surrounding a stator 17 which in turn surrounds a rotor 18 mounted on the shaft 12. A pair of annular end covers 19 are connected to the yoke and form the stator chamber. A cylindrical stator can 20 is positioned intermediate the rotor 18 and the stator 17 to form a rotor chamber 21 in which the rotor rotates. The can 20 is sealed at both ends to hydraulically seal the stator from the rotor chamber. This can be accomplished in any suitable way but as illustrated an O-ring 22 is compressed between each end of the can 20 and the associated member that closes the rotor chamber of the motor. In some applications it may also be desirable to encase the rotor in a can 24 to protect it from the liquid in the rotor chamber 21.

A centrifugal pump impeller 13 is mounted on the extended end of the shaft 12. However, it would be obvious to those skilled in the art that any other type of fluid handling or pumping device could be mounted on the end of the shaft. The impeller 13 is surrounded by a suitable pump casing 26 having an axial inlet 27 and a radially spaced discharge volute 28 that are aligned with the intake and outlet, respectively, of the impeller.

A bearing housing 30 surrounds the shaft 12 and is positioned intermediate the motor 11 and the pump 14. The bearing housing 30 is connected to the pump casing 26 by bolts 31 and forms the back cover plate of the pump. The other end of the bearing housing 30 is connected to the end cover 19 of the motor housing by bolts 32 and closes one end of the motor chamber 21. This portion of the bearing housing cooperates with the flared portion of can 20 to compress O-ring 22 therebetween.

In the illustrated embodiment a second bearing housing 35 surrounds the end of shaft 12 on the other side of the rotor 18. The bearing housing is shown as being bell-shaped and is connected to an end cover 19 of the motor housing 16 by suitable bolts 36 and closes the other end of the rotor chamber 21.

Suitable bearings such as the illustrated sleeve bearings 38, 39 are mounted on the radially inner surface of the bearing housings 30, 35. The bearings surround and support the rotating shaft 12 in the usual manner. These bearings are shown as being lubricated by the liquid being pumped, but may be lubricated from a separate source of lubricant if desired.

Suitable conduits are provided for bringing lubricant under pressure into the bearing housings. In the preferred embodiment as shown, this lubricant is the liquid being pumped and is brought into the bearings from the discharge side of the centrifugal pump. Specifically, a conduit 40 is formed in the first bearing housing 30 and connects the discharge side of the pump 14 with the inboard side of the sleeve bearing 38. Pipe 41 connects the discharge nozzle 28a of the pump 14 to the second bearing housing 35. The liquid entering the bearing housing 35 is used to lubricate the bearing 39. Furthermore, some liquid leaks behind the impeller and along the shaft to the bearing 38 intermediate the pump and the motor to help lubricate the bearing.

The unit 10 is also provided with means for draining the liquid used to lubricate the bearings back to the intake side of the pump so that none of the liquid leaks out of the system. In this particular arrangement, the shaft 12 has an axial conduit 44 extending almost the entire length of the shaft and has radial holes 45 in communication with the conduit 44 and the annular spaces 46 adjacent the bearings being lubricated. In this manner the liquid flows around the bearings for lubrication and then into the conduit 44 in the shaft 12 and from there to the low pressure intake side of the pump impeller 13.

The primary concern in motor pump units of this type is to eliminate leakage of liquid out of the hydraulic system. However, it is extremely difficult to provide a prefect seal in the pumping unit especially between a rotating member such as the shaft 12 and a stationary member such as the rear cover of the pump casing. In the illustrated unit, leakage from the system is prevented by allowing the liquid to flow behind the impeller along the shaft past the stationary member and then back through the shaft to the inlet side of the impeller.

Normally some of this liquid leaking along the shaft would enter the rotor chamber. If the rotor chamber is full of liquid during operation of the motor, it causes a significant drag on the rotor and thereby greatly reduces the efficiency of the unit. Therefore, in this unit means are provided to limit the amount of fluid entering the rotor chamber so that substantially all of the liquid entering the chamber is vaporized during the operation of the motor. Then the motor operates in a chamber full of gas rather than a chamber full of liquid and the drag on the rotor is considerably reduced and the efficiency of the motor pump unit is correspondingly increased. Means are provided to return to the inlet side of the impeller any vapor that escapes from the rotor chamber and condenses.

As mentioned above, the liquid that leaks along the shaft serves to lubricate the bearings. However, in many cases additional liquid may be required to lubricate the bearings, especially if the unit is provided with a second bearing on the outboard side of the motor. In the illustrated unit, the extra liquid is obtained from the high pressure liquid in the discharge volute of the pump. This liquid is directed to the bearings as described above. The extra liquid for lubricating the bearings flows near the rotor chamber and hence complicates the problem of limiting the amount of liquid entering the rotor chamber 21. However, the flow into the rotor chamber can be controlled by reducing the pressure of the liquid lubricating the bearings and controlling the pressure drop across the rotor chamber so that it becomes a negligible factor. This can be accomplished by providing suitable control valves such as valve 48 or other pressure reducing means in the conduits between the discharge side of the pump and the bearings.

To more closely control or substantially eliminate the flow of liquid into the rotor chamber and to control the pressure drop across the rotor chamber bushings 50 are mounted on the shaft 12 intermediate the bearings 38, 39 being lubricated and the rotor chamber 21. These bushings 50 are mounted on the shaft and positioned to form with the bearing housings 30, 35 a close clearance 51 in the hydraulic path between the bearings 38, 39 and the interior of the rotor chamber. The clearances 51 are relatively long and have a very small radial space to effect a significant pressure drop across the bushing and retard the flow of liquid into the rotor chamber. In the illustrated embodiment, bushings are used on both ends of the rotor to minimize the pressure drop across the rotor chamber. These bushings also serve as a flame path bushing to confine, retard and extinguish any flames emanating from an explosion within the rotor chambers. Use of bushings for quenching flames is well known in the motor art.

In the small motor pump units one bearing may be sufficient to support the shaft. If only a single bearing is used, means are provided for limiting the flow of liquid into the rotor chamber. Such control means would be similar to the bushing 50 between the motor and the pump. Furthermore, a return passage for any excess liquid that might be in the rotor chamber would also be provided. The return passage would be from the rear of the rotor chamber through the shaft back to the intake side of the impeller. Means such as a flame path bushing will be provided in the return passage for controlling the flow of liquid through the rotor chamber.

In operation as the motor pump unit 10 is started up liquid is drawn into the impeller and thrown radially outward through the discharge volute. As the unit operates a certain amount of liquid leaks behind the impeller and flows axially along the shaft. Some of this liquid is used to lubricate the front bearing 38. But most of it passes radially inward through one of the radial holes 45 in the shaft 15 into the axially extending conduit 44 within the shaft and hence back to the low pressure inlet side of the impeller. An additional amount of liquid is tapped from the discharge side of the pump and directed through the conduit 40 in the bearing housing 30 to lubricate the bearing 38. Part of this liquid tends to pass through the clearance 51 between the bushing 50 and the bearing housing 30 into the rotor chamber 21. Another portion of the liquid flows between the bearing 38 and the shaft 12 to lubricate the bearing. The remainder flows radially inward into the interior of the hollow shaft.

In the illustrated unit, still further liquid is tapped from the discharge nozzle 28a of the pump and directed through pipe 41 and control valve 48 into bearing housing 35 at the other end of the unit. Here the liquid enters the bearing housing and flows around the shaft 12 to lubricate the bearing 39. The end of the shaft surrounded by the bearing housing 35 is closed to force the liquid entering the housing to flow around the shaft and lubricate the bearing 39. When the liquid has passed the bearing, a portion of it tries to flow past the bushing 50 through the clearance 51 into the rotor chamber 21. The remainder of the liquid flows through radial holes 45 into the hollow portion of the shaft and then back through the shaft to the inlet side of the pump.

The very small amount of liquid that passes through the clearances into the rotor chamber 21 is immediately vaporized by the heat generated by the motor during operation of the motor. In the gas state the vapor within the rotor chamber increases in temperature and since it is also somewhat confined the pressure of this gas tends to increase. The increased pressure tends to prevent any further flow of liquid into the rotor chamber. Therefore, while the motor is operating the rotor chamber is filled with a gas rather than a liquid. If the pressure becomes excessive in the rotor chamber, part of the vapor will tend to escape through the clearances 51 past the flame bushings 50 back toward the bearings. This vapor then mingles with the liquid in the hydraulic system and is condensed and returned to the inlet side of the pump.

Although but one embodiment of this invention has been illustrated and described, it will be apparent to those skilled in the art that various changes and modifications can be made therein without departing from the spirit of the invention nor the scope of the appended claims.

Having now particularly described and ascertained the nature of my said invention and the manner in which it is to be performed, I declare that what I claim is:

1. A motor pump unit comprising: an annular stator, a motor housing surrounding said stator, a rotor mounted within said stator, a cylindrical can positioned intermediate said rotor and said stator to form a chamber in which said rotor rotates, a shaft connected to said rotor and extending out of said chamber, an impeller mounted on the extended end of said shaft, a pump casing surrounding said impeller, a bearing housing surrounding said shaft intermediate said rotor and said impeller, means on said shaft positioned to cooperate with said bearing housing to form such a close clearance therebetween as to limit the amount of liquid entering said can to such a small amount that during operation, said liquid will be completely vaporized by the heat generated by the motor.

2. A motor pump unit comprising: an annular stator, a motor housing surrounding said stator, a rotor mounted within said stator, a cylindrical can positioned intermediate said rotor and said stator to form a chamber in which said rotor rotates, a shaft connected to said rotor and extending out of said chamber, an impeller mounted on the extended end of said shaft, a pump casing surrounding said impeller, said shaft between said rotor and said impeller cooperating with said casing to form such a close clearance therebetween as to limit the amount of liquid entering said can to such a small amount that during operation, said liquid will be completely vaporized by the heat generated by the motor.

3. A motor pump unit comprising: an annular stator, a motor housing surrounding said stator, a rotor mounted within said stator, a cylindrical can positioned intermediate said rotor and said stator to form a chamber in which said rotor rotates, a shaft connected to said rotor and extending out of said chamber, an impeller mounted on the extended end of said shaft, a pump casing surrounding said impeller, means on said shaft between said rotor and said impeller cooperating with said housing to form such a close clearance therebetween as to limit the amount of liquid entering said can to such a small amount that during operation, said liquid will be completely vaporized by the heat generated by the motor.

4. A motor pump unit comprising: an annular stator, a motor housing surrounding said stator, a rotor mounted within said stator, a cylindrical can positioned intermediate said rotor and said stator to form a chamber in which said rotor rotates, a shaft connected to said rotor and extending out of said chamber, an impeller mounted on the extended end of said shaft, a pump casing surrounding said impeller, a bearing housing surrounding said shaft intermediate said rotor and said impeller, means on said shaft positioned to cooperate with said bearing housing to form such a close clearance therebetween as to limit the amount of liquid entering said rotor chamber to such a small amount that during operation, said liquid will be completely vaporized by the heat generated by the motor, and conduits connecting said chamber to a region of lower pressure, and regulating means in said conduits for minimizing the pressure differential across said rotor chamber.

5. A motor pump unit comprising: a motor housing, an annular motor stator mounted within said housing, a rotor positioned within said stator, a cylindrical can positioned intermediate said rotor and stator to form a chamber in which said rotor rotates, said can being sealed at both ends to hydraulically separate said rotor and said stator, a shaft operatively connected to said rotor and extending through said housing, a centrifugal pump casing spaced from said housing, said casing having an axial inlet and a radially spaced outlet, an impeller connected to said shaft and positioned within said casing in alignment with said inlet and said outlet, means positioned intermediate said rotor and said impeller to form such a close clearance with said shaft as to limit the amount of liquid leaking along said shaft into said rotor chamber to such a small amount that substantially all the liquid that flows into said chamber is vaporized by the heat generated by the motor and conduit means connecting the interior of said rotor can to the inlet side of said pump and means positioned in said conduit for minimizing the pressure differential across said rotor chamber.

6. A motor pump unit comprising: a motor housing, an annular motor stator mounted within said housing, a rotor positioned within said stator, a cylindrical can positioned intermediate said rotor and stator to form a chamber in which said rotor rotates, said can being sealed at both ends to hydraulically separate said rotor and said stator, a shaft operatively connected to said rotor and extending through said housing, a centrifugal pump casing spaced from said housing, said casing having an axial inlet and a radially spaced outlet, an impeller connected to said shaft and positioned within said casing in alignment with said inlet and said outlet, first bearing housing surrounding said shaft and positioned intermediate said motor housing and said casing, said first bearing housing forming the rear cover of said casing and a front cover of said motor housing, a second bearing housing surrounding said shaft and positioned at the other end of said rotor, said second bearing housing forming the rear cover of said motor housing, bushings mounted on said shaft and positioned to form such a close clearance with the inner surface of said bearing housings to balance the pressure across said rotor and thereby limit the amount of liquid entering said rotor chamber to such a small amount that all the liquid that flows into said chamber is vaporized by the heat generated by the motor.

References Cited in the file of this patent
UNITED STATES PATENTS

| | | |
|---|---|---|
| 2,741,990 | White | Apr. 17, 1956 |
| 2,963,980 | White | Dec. 13, 1960 |
| 2,986,905 | Kocher et al. | June 6, 1961 |